3,050,495
COMPOSITIONS COMPRISING BLENDS OF ALDEHYDE-MODIFIED AMIDE INTERPOLYMERS WITH AMINE RESINS AND ARTICLES COATED THEREWITH
Roger M. Christenson, Richland Township, Allegheny County, Pa., assignor to Pittsburgh Plate Glass Company
No Drawing. Filed Aug. 12, 1957, Ser. No. 677,778
10 Claims. (Cl. 260—45.2)

This invention relates to resinous compositions useful as film-forming materials, and pertains more particularly to blends of an interpolymer of an unsaturated amide with at least one other compound containing a terminal $CH_2=C<$ group, with a triazine-aldehyde resin or a urea-aldehyde resin.

In the now abandoned application, Serial No. 584,473, filed May 14, 1956, to Roger M. Christenson, which in turn is a continuation-in-part of another copending application, Serial No. 490,409, filed February 24, 1955, now abandoned, it is disclosed that useful resinous materials are readily obtained by reacting an aldehyde, particularly formaldehyde, with an interpolymer of acrylamide and one or more polymerizable ethylenically unsaturated monomers. The resulting resins range from soft flexible materials to very hard solids, depending upon the choice of monomers utilized in preparing the amide interpolymer which is in turn reacted with the aldehyde. These resins give very tough and mar resistant films which possess excellent chemical resistance, and which are useful for many other purposes.

While the above-described interpolymers are outstandingly successful for many applications, the baking operation involved in converting them to the thermoset state ordinarily requires temperatures of about 350° F. for approximately 30 minutes, which imposes certain limitations in the use of these materials. For example, many industries do not have baking facilities of sufficient flexibility to cure films at temperatures substantially above 300° F., this factor placing a limitation on the utilization of the unsaturated amide interpolymers.

It has now been discovered that the unsaturated amide interpolymers which contain methylol or other alkylol groups, may be successfully blended or reacted with the amino resins, particularly the urea-aldehyde resins and the triazinealdehyde resins, to provide compositions which can be cured to a hard, resistant, thermoset state within a relatively short time and often at reduced temperatures. Some of these blends cure at temperatures which render them suitable even for application to wood or other materials which do not successfully withstand high temperature baking, and they are particularly useful for application in those industries where present equipment limitations impose a maximum film baking temperature of approximately 300° F. The amino resin may also be employed beneficially to enhance certain other properties of the modified amide interpolymers, including hardness, resistance to moisture and resistance to hot grease. For example, films of the resinous compositions of this invention maintain their original color, gloss and hardness even when in contact with hot grease for prolonged periods. Films of the amide interpolymers without amine resin modification darken, lose gloss and soften in contact with hot grease, even for relatively short periods. The amino resins further provide in many instances a convenient means for reducing the cost of coating compositions containing the modified amide interpolymers.

The exact mechanism whereby the amide interpolymers are obtained is not definitely known, but is believed to begin by the formation initially of a relatively short chain soluble interpolymer having an approximate structure as follows, acrylamide being utilized for illustrative purposes:

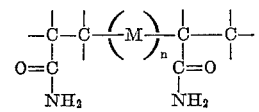

wherein M represents a unit of a monomer or monomers polymerizable with acrylamide, and $n$ represents a whole number of at least 1. For example, if styrene were utilized as the second monomer, M would represent the unit

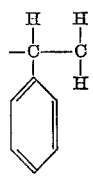

The short chain interpolymer then reacts with an aldehyde or a material which reacts as an aldehyde to provide the structure

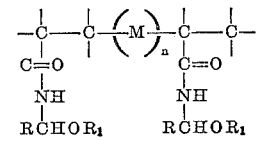

wherein the group

replaces amido hydrogen and in which R is a member selected from the class consisting of hydrogen, furyl and lower alkyl radicals and $R_1$ is a member of the class consisting of hydrogen lower alkyl and butoxyethyl radicals, and M and $n$ have the significance previously attached thereto.

If the aldehyde is formaldehyde, the resultant structure is:

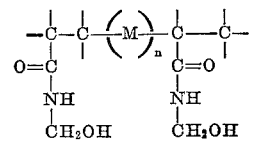

wherein M and $n$ are of the significance previously indicated.

It is well known that if the reaction between an amine radical and an aldehyde takes place in the presence of an alkanol such as butanol (Payne, Organic Coating Technology, Wiley & Sons, New York, 1954, volume I, pages 328–336), that at least some of the hydroxyl groups will be converted to ether groups.

It will be recognized that amides such as acrylamide or methacrylamide may be reacted with formaldehyde, or a compound such as trioxymethylene which liberates formaldehyde, to form methylol acrylamide or methylol methacrylamide and either of these methylol derivatives may be interpolymerized with the other monomer component or components containing an ethylenically unsaturated acid such as acrylic or methacrylic acid. The methylol groups of these polymers can be converted to alkoxy groups by reaction with an alkanol. The resultant interpolymers are the same as, or at least very similar to those resulting when the monomers are first interpolymerized and the interpolymer is then reacted with formaldehyde in the presence of an alcohol.

Among the monomers which may be polymerized with acrylamide and other unsaturated amides are included methyl acrylate, ethyl acrylate, butyl acrylate, isobutyl acrylate, hexyl acrylate, octyl acrylate, methyl methacrylate, ethyl methacrylate, lauryl methacrylate, styrene, vinyl toluene, maleate esters such as dibutyl maleate, butyl acid maleate, acrylic acid, methacrylic acid, maleic anhydride, vinyl ethers, vinyl ketones, vinyl pyridines, allyl acetoacetates, glycidyl acrylate, dimethylbenzyl methacrylate, pentamethyldisiloxane methyl methacrylate, and the like. In general, it is preferred that the monomer utilized contain a single $CH_2=C<$ group in terminal position, and an especially preferred group of monomers includes ethyl acrylate, butyl acrylate, methyl acrylate, methyl methacrylate, styrene, vinyl toluene, acrylic acid, methacrylic acid, and monomethyl styrene.

It has been found that preferred interpolymers are obtained when at least two monomeric compounds are interpolymerized with the amide. In this manner it is possible to tailor the interpolymer to have any desired degree of hardness and/or flexibility. For example, one useful ternary interpolymer is prepared from acrylamide, ethyl acrylate, and styrene. Also, a small amount of methyl methacrylate tends to improve somewhat the hardness of two-component interpolymers where one of the monomers is of the type which forms a soft homopolymer, and up to 35 percent by weight of an acid monomer such as acrylic acid, methacrylic acid, or butyl acid maleate, has been found to be particularly useful as an internal catalyst in that it imparts to the coating composition desirable fast, low temperature curing properties, as well as greatly enhanced compatibility, this being particularly true when the resulting amide interpolymer resins are blended with the amino resins.

Interpolymers of a polymerizable amide with one or more polymerizable monomers are most readily prepared by carrying out the polymerization in a solvent in which the amide and the other monomer/s are soluble, and at reflux temperatures. Butanol has proven to be a satisfactory solvent in most cases. Isopropyl alcohol, ethylene glycon monobutyl ether, and mixtures of butanol or other lower alkanol with water can also be used advantageously as solvents. Some care must be exercised when water is present in the system as gummy precipitates may result, especially at the higher water levels. The presence of lower alcohols or water has been found to moderate the speed of reaction by lowering the reflux temperature. Butyl or ethyl acetate, or other ester solvents, and hydrocarbons such as xylene and the like may also be employed.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl) ether, may also be used as polymerization catalysts in the preparation of amide interpolymers. Redox catalysts systems can also be employed.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of acrylamide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers, and the like can be used to secure low molecular weights, as can unsaturated fatty acids or esters.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out the polymerization of the very rapid reaction rate and because the reaction is highly exothermic. Some control of the heat of reaction is obtained by adding the acrylamide to the polymerization mixture incrementally. Good agitation is also desirable.

Another method for preparing acrylamide interpolymers involves utilization of "block" or "graft" techniques. Conventional polymerization procedures, such as that described in the foregoing paragraph, ordinarily result in a random distribution of the components in the interpolymers. By "block" or "graft" methods, the component can be introduced into the composition in regular sequence or order, each segment being of a certain length and periodicity. These products can be made such that the amide portion is in fixed position in the chain, this approach involving the preparation of segments which react in groups or react in sites along a preformed backbone from which or to which other segments can be grown or attached. The properties of materials prepared by this relatively new technique are known to be quite different in many instances from interpolymers in which the components are randomly oriented. By the "block" or "graft" method, one can prepare, by choice, materials of different solubility, solvent and flame resistance, adhesion, water solubility, and, in fact, almost any desired property can be "tailored" into the interpolymer.

Useful resinous materials containing polymerizable amides are obtained by reacting the interpolymers prepared according to the method described above with an aldehyde. Formaldehyde, in solution in water (formalin) or in a lower alcohol such as butanol, or a formaldehyde yielding substance such as para-formaldehyde, trioxymethylene, or hexamethylenetetramine, is greatly preferred. However, other aldehydes including acetaldehyde, butyraldehyde, furfural, and the like, preferably containing only atoms of carbon, hydrogen, and oxygen, can be used. Dialdehydes such as glyoxal should not be utilized as they cause gelation to occur during the polymerization reaction.

It is preferred that the aldehyde be reacted with an interpolymer containing from about 5 percent to about 50 percent by weight of amide, the balance being the other ethylenically unsaturated monomer/s. It has been found that those interpolymers containing the higher levels of amide with those monomers which ordinarily form hard homopolymers, give hard and tough films, whereas interpolymers containing lower levels of amide with those monomers which ordinarily form soft homopolymers tend to be considerably softer. If more than one ethylenically unsaturated monomer is polymerized with the amide, the proportions of such additional monomers utilized will depend upon the characteristics which such monomer or monomers will impart to the final interpolymer. For example, in some ternary interpolymer systems it may be desirable to utilize about 15 percent by weight of the amide, and 40 percent to 45 percent of two additional monomers such as styrene and ethyl acrylate, or in some instances, such as when acrylic acid or some other ethylenically unsaturated acid is utilized as an internal catalyst, it is desirable that the interpolymer contain about 15 percent acrylamide, a total of about 60 percent to 84 percent of two additional ethylenically unsaturated monomers and about 1.0 percent to about 25 percent of the unsaturated acid. The amount of the monomers necessary in any interpolymerization reaction can readily be determined by simple experiment.

It is ordinarily preferred to utilize two equivalents of aldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of aldehyde for each amide group in the interpolymer, or as low as about 0.2 equivalent of aldehyde for each amide group in the interpolymer. Apparently only one equivalent of the aldehyde reacts with the amide groups, with the second equivalent undergoing reaction with the alkanol to form a dialkyl formal, which compounds are oxygenated solvents possessing excellent solvent power.

The aldehyde-interpolymer reaction is preferably carried out in the presence of a mild acid catalyst such as maleic anhydride. Other acid catalysts such as oxalic acid, hydrochloric acid, or sulfuric acid, may also be utilized, although there is some possibility of gelation occurring if the catalyst is too strongly acidic. Alkaline catalysts such as sodium hydroxide, potassium hydroxide, hexamethylenetetramine, and other basic amines may also be utilized, and, in fact, there is evidence to indicate that the use of the basic catalysts tends to give faster curing resin films.

If desired, the catalyst may be dispensed with entirely, although it is difficulty to obtain satisfactory reaction unless a catalyst is employed. The quantity of catalyst utilized may be varied widely; for example, as pointed out hereinabove, the more acidic the reaction medium, the greater the amount of etherification which will occur if an alcohol solution of the aldehyde is utilized. In general, however, it is preferred to utilize from about 0.2 percent to 1.0 percent by weight of catalyst, based upon the weight of the amide interpolymer which is reacted with the aldehyde.

The reaction of the amide interpolymer with the aldehyde can be carried out simply by adding the aldehyde and the catalyst (if one is utilized) to the polymerization mixture obtained by polymerizing the amide and one or more ethylenically unsaturated monomers and refluxing the resulting mixture for a period of from about 1 to 5 hours until a desired viscosity is obtained. The water of condensation can be removed by azeotropic distillation as may a portion of the solvent if desired. In fact, when the aldehyde is utilized in the form of a solution in an alkanol such as butanol, it is desirable that approximately half of the butanol be distilled off at the end of the reaction period and replaced by another solvent such as xylol. It is preferred that the final resinous material have a solids content of about 20 percent to 70 percent.

Other polymerizable amide monomers which may be employed either alone, or in combination with other amides, include maleuric acid and esters thereof as represented by the formula:

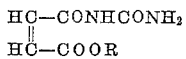

wherein R is an alkyl radical, and its imide derivatives such as N-carbamyl maleimide of the structure:

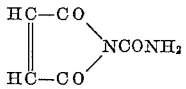

Still other polymerizable monomeric amides which may be employed with good results include the N-alkoxymethyl acrylamides which are obtained by the reaction of acrylamide with an alcohol solution of formaldehyde. For example, in this manner N-butoxymethyl acrylamide is obtained by the reaction of acrylamide with a solution of formaldehyde in butanol in the presence of additional butanol. These monomers are particularly useful in that they can be readily polymerized alone, or with other monomers in emulsion, whereas acrylamide, which is soluble in water, can be polymerized therein only with great difficulty. Moreover, when the N-alkoxymethyl acrylamides are utilized the subsequent reaction with an aldehyde is unnecessary.

Regardless of the method by which the resinous material is obtained, the resulting polymers are ungelled and substantially water insoluble, and will contain in the polymer chain recurrent groups of the structure:

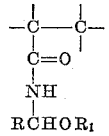

wherein R is a member selected from the class consisting of hydrogen, furyl and lower alkyl radicals, that is, the radical derived by removing the oxygen from the lower aliphatic aldehyde. Stated in another way, the interpolymers utilized in forming the resinous compositions of this invention are characterized by having the amido hydrogen atoms replaced by the structure:

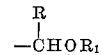

wherein R is a member selected from the class consisting of hydrogen, furyl and lower alkyl radicals, and $R_1$ is a member of the class consisting of hydrogen and lower alkyl radicals. The free valences may be substituted with either hydrogen or hydrocarbon, depending on the unsaturated amide which is utilized.

As indicated hereinabove, the excellent resinous compositions of this invention are obtained by blending, or in some cases actually reacting, the unsaturated amide interpolymers with an amino resin. The term "amino resin" as utilized herein is intended to include the class of resins based on urea-formaldehyde and triazine-aldehyde, particularly melamine-aldehyde, condensation products.

The preparation of the amino resins has been known for many years, and need not be elaborated upon herein except to state that the resins are condensation products of amino compounds with aldehydes, which condensation products may be etherified with various alcohols and polymerized to the required degree. Therefore, competing reactions are taking place simultaneously: Condensation, etherification and polymerization. Control of these reactions during the preparation of the resin is obtained by adjusting the type and ratio of components, and the reaction conditions of catalysts, time and temperature.

The preferred amino resins for blending with the unsaturated amide interpolymers are condensation products of urea and formaldehyde and melamine and formaldehyde which have been etherified by reaction with a lower alcohol, preferably butanol. The etherification has been found to enhance appreciably the compatibility of the amide interpolymer and the amino resin. For example, it is possible to prepare blends in which the amino resin constitutes from about 5 percent to 95 percent by weight of the resinous composition, with the remainder thereof being the unsaturated amide interpolymer resin. The compatibility of the two resinous materials is even further increased and the cure temperature of the resulting blend is substantially decreased if the amide interpolymer is prepared utilizing as one component from about 1 percent to 35 percent by weight of an unsaturated carboxylic acid such as acrylic acid, methacrylic acid, crotonic acid, or an alkyl acid maleate such as butyl acid maleate. In fact, the compositions of this invention possessing optimum properties are those in which an alkylated melamine-formaldehyde or urea-formaldehyde resin is blended with an aldehyde modified interpolymer of acrylamide, acrylic or methacrylic acid, and a third monomer such as styrene or ethyl acrylate.

In addition to the alkylated amino resins, which are substantially water insoluble, but readily soluble in organic solvents, the water soluble amino resins can in some cases be blended with the unsaturated amide interpolymers to produce useful compositions. This is particularly true when the amide interpolymer is prepared in the form of a latex in which event blends thereof with the amino resins are actually water based baking finishes.

In addition to blends of the amide interpolymer resins and the amino resins, it is also possible to include in such compositions minor quantities of other resinous materials such as alkyd resins, vinyl resins, nitrocellulose, epoxy resins, and the like.

The following examples illustrate in detail the preparation of amide interpolymers in which the amide groups are modified in the manner described hereinabove, and blends of such interpolymers with amino resins. The examples are not intended to limit the invention, however, for there are, of course, numerous possible variations and modifications.

The melamine-formaldehyde and urea-formaldehyde resins utilized in the specific examples, and designated therein as $M_1$, $U_1$ and $U_2$, possess the following properties:

| Formaldehyde/Melamine or Urea | Melamine-Formaldehyde $M_1$ | Urea-Formaldehyde $U_1$ | Urea-Formaldehyde $U_2$ |
|---|---|---|---|
| Molar Ratio | 6.0 | 2.19 | 3.20 |
| Percent Resin | 60 | 50 | 50 |
| Percent Butanol | 32 | 25 | 34.5 |
| Percent Xylene | 8.0 | 25 | 5.5 |
| Percent Solids at 110° C | 58–62 | 48–52 | 48–52 |
| Naphtha Tolerance | 200–400 | 100–130 | 200–250 |
| Acid Number | Maximum 1.0 | Below 2.0 | |
| Viscosity (Gardner-Holdt) | U–V | X–Y | N–R |

*Examples I to III*

In these examples the preparation of interpolymers containing acrylamide is illustrated. In each example, butanol was used as the solvent and cumene hydroperoxide as the catalyst. The polymerization was carried out by admixing the monomers in butanol and adding one-half of the catalyst thereto. The mixture was then refluxed for 2 hours, and one-half of the remaining catalyst added. The mixture was again refluxed for 2 hours, and the remaining catalyst added. After an additional 2 hours of refluxing, substantially 100 percent conversion to interpolymer was obtained. The interpolymer thus obtained was then reacted with formaldehyde (as a 40 percent solution in butanol) in the presence of maleic anhydride as a catalyst. In Examples I and III about one-half of the butanol was distilled off and replaced with a hydrocarbon solvent such as toluene. The pertinent data regarding the preparation and properties of the aldehyde modified amide interpolymers is set forth in the following table. Unless otherwise indicated, the amounts of materials in the polymerization charge are in pounds.

| Monomer Charge | Example I | Example II | Example III |
|---|---|---|---|
| Acrylamide | 3.0 | 3.0 | 2.0 |
| Vinyl Toluene | 17.0 | | |
| Styrene | | 5.0 | 5.0 |
| Ethyl Acrylate | | 12.0 | 13.0 |
| Methyl Methacrylate | | | |
| Solvents, Catalyst and Modifiers: | | | |
| Butanol | 9.3 | 18.6 | 9.3 |
| Cumene Hydroperoxide__grams_ | 187.6 | 187.6 | 181.6 |
| Tertiary Dodecyl Mercaptan grams_ | 90.8 | 90.8 | 90.8 |
| Formaldehyde (40+ in Butanol) | 6.3 | 6.4 | 4.23 |
| Maleic Anhydride_____grams_ | 38.1 | 36.3 | 24.0 |
| Hydrocarbon Solvent Added | 9.3 | | 9.3 |
| Product Properties | | | |
| Viscosity (Gardner-Holdt) | X–Z | W–Z | T–X |
| Color (Gardner) | 9 | 6 | 7 |
| Solids Content (Per Cent) | 48–52 | 48–52 | 48–52 |
| Weight Per Gallon (Pounds) | 7.9 | 7.9 | 8.1 |

The interpolymers thus prepared were then blended with various amounts of both urea-formaldehyde resins and melamine-formaldehyde resins. The resin of Example I was extremely compatible with melamine-formaldehyde resins, particularly with melamine-formaldehyde resin $M_1$. Each of the resins was compatible with urea formaldehyde resins, although not over as broad a range of proportions as is the case with the melamine-formaldehyde resins. Films of the compositions obtained by blending the resins of Examples I to III inclusive with either urea-formaldehyde resins or melamine-formaldehyde resins, were hard, tough and mar resistant when baked for about 30 minutes at 300° F.

*Example IV*

An interpolymer was prepared from the following components:

| | Pounds |
|---|---|
| Styrene | 300.0 |
| Acrylic acid | 125.0 |
| Acrylamide | 75.0 |
| Cumene hydroperoxide | 5.0 |

The monomers were admixed with 5.0 pounds of tertiary dodecyl mercaptan and 500 pounds of butanol. This mixture was refluxed for 5 hours with 2.5 pounds of cumene hydroperoxide being added after 1½ hours, and an additional 2.5 pounds being added after 3 hours, after which 180 pounds of a 40 percent solution of formaldehyde in butanol was added together with 4.2 pounds maleic anhydride and 100 pounds of toluene. The resulting reaction mixture was then refluxed for 2 hours and 350 pounds of solvent distilled off and replaced with 250 pounds of toluene. The resin had the following properties:

| | |
|---|---|
| Total solids _____percent__ | 52 |
| Viscosity (Gardner-Holdt) | $Z_1$ |
| Acid value | 60–65 |

The resin thus obtained was then blended with varying amounts of melamine-formaldehyde and urea-formaldehyde resins, and films of the resulting compositions baked at both 250° F. and 350° F. for one-half hour to determine whether there were substantial differences in the degree of cure achieved at each temperature. The Sward hardness and pencil hardness, both of which are good indications of the degree of cure, were measured on each film and the results are set forth in the following table:

| Modifying Resin | Amount of Modifying Resin, Percent | Baking Temperature, °F. | Sward Hardness | Pencil Hardness (2 Hours in Ethanol) |
|---|---|---|---|---|
| $M_1$ | 30 | 250 | 36 | F |
| $M_1$ | 30 | 350 | 38 | H |
| $U_2$ | 30 | 250 | 42 | F |
| $U_2$ | 30 | 350 | 38 | 2H |
| $U_1$ | 30 | 250 | 36 | B |
| $U_1$ | 30 | 350 | 38 | HB |
| $M_1$ | 50 | 250 | 56 | B |
| $M_1$ | 50 | 350 | 56 | B |
| $U_2$ | 50 | 250 | 52 | F |
| $U_2$ | 50 | 350 | 52 | H |
| $U_1$ | 50 | 250 | 56 | HB |
| $U_1$ | 50 | 350 | 48 | HB |

Each of the films described above was clear, indicating complete compatibility of the modified amide interpolymer and the amino resin.

This example illustrates the advantages of modifying the amide interpolymer by the addition of an amino resin in that the unmodified amide interpolymer must be cured at temperatures of about 350° F. in order to obtain a satisfactory degree of hardness and resistance to solvents.

*Example V*

An interpolymer was prepared substantially in accordance with the method of Example I utilizing as the monomeric components thereof 48 parts by weight of butyl acrylate, 38 parts by weight of methyl methacrylate, 9 parts by weight of acrylamide and 5 parts by weight of methacrylic acid. The interpolymer obtained had a viscosity of Z at 50 percent solids. Films of the interpolymer baked at 350° F. for 30 minutes had a Sward hardness of 26. The interpolymer was then admixed with 30 percent by weight of a highly butylated melamine-formaldehyde resin and films of the resulting composition baked at 250° F. and 350° F. respectively on steel panels. The film baked at 250° F. had a Sward hardness of 30 and the film baked at 350° F. had a Sward hardness of 34. The mar resistance of the films was not as good as the mar resistance of films prepared by blending amino resins with acrylamide interpolymers wherein an unsaturated monocarboxylic acid monomer is utilized in an amount of about 25 percent by weight based on the monomeric components of the interpolymer.

*Example VI*

An interpolymer was prepared according to the method of Example I utilizing the following as the monomeric components:

| | Parts by weight |
|---|---|
| Styrene | 39 |
| Ethyl acrylate | 44 |
| Acrylamide | 15 |
| Acrylic acid | 2 |

One percent of cumene hydroperoxide and 1 percent of tertiary dodecyl mercaptan were utilized in the preparation of the polymer as a catalyst and chain stopper, respectively.

This polymer was then reacated with a butanol solution of formaldehyde in an amount of 2 moles formaldehyde per mole of acrylamide in the presence of 3.0 percent by weight of a maleic anhydride catalyst. The resulting polymer had the following properties:

| | |
|---|---|
| Viscosity (Gardner-Holdt) | S–W |
| Color (Gardner) | <5 |
| Solids | percent, 48–52 |
| Weight per gallon | 8.0±0.1 |
| Acid value | 6–8 |

Two hundred sixty (260) parts of interpolymer thus prepared was then admixed with 1100 parts titanium dioxide and Baker Perkins milled for 30 minutes. Two hundred eighty-eight (288) additional parts of the resin of the example were added to the paste and milled for 30 minutes.

This paste was then utilized to formulate two coating compositions with the following components:

| | Composition A | Composition B |
|---|---|---|
| Paste | 421 | 421 |
| Resin of Example VI | 410 | 358 |
| 60 Percent Solids Solution of Epon 1001 | 52 | 52 |
| Pine Oil | 10 | 10 |
| 1 Percent Solution of Silicone (Linde X–12) | 2 | 2 |
| Xylol | 115 | 115 |
| Melamine-Formaldehyde Resin | | 52 |

The numerical values in the columns headed "Composition A" and "Composition B" represent parts by weight.

Films of both compositions were then spray coated onto steel panels to a thickness of 1½ mils and baked for 30 minutes at 350° F. The films were then immersed in vegetable oil maintained at 200° F. for 1 hour and examined visually for defects. The films of Composition B were superior in color holding, gloss retention, and hardness properties to the films of Composition A.

Moreover, when films of Composition B prepared as above are immersed in ethanol for 2 hours, no softening occurs, whereas the films of Composition A soften considerably under these conditions.

Excellent resinous compositions are also obtained when other of the unsaturated amide interpolymers disclosed hereinabove are substituted for those employed in the specific examples. Similarly, other amino resins may be substituted for the specific urea-formaldehyde and melamine-formaldehyde resins employed in the examples.

Although specific examples have been set forth hereinabove, it is not intended that the invention be limited solely thereto, but to include all of the variations and modifications falling within the scope of the appended claims.

This application is a continuation-in-part of copending application Serial No. 665,109, filed June 12, 1957, now U.S. Patent 2,978,437; and U.S. application Serial No. 584,473, filed May 4, 1956 (now abandoned); which in turn is a continuation-in-part of application Serial No. 490,409, filed February 24, 1955 (now abandoned).

I claim:

1. A resinous composition comprising an amino resin selected from the class consisting of urea-formaldehyde resins and melamine-formaldehyde resins, and an interpolymer of an amide selected from the class consisting of acrylamide, methacrylamide, maleuric acid, alkyl esters of maleuric acid, N-carbamyl maleimide, and N-alkoxymethyl acrylamides, and at least one other monomer containing a $CH_2=C<$ group, said interpolymer containing from about 5 percent to 50 percent by weight of said amide in polymerized form based on the total weight of said interpolymer and being characterized by having amido hydrogen atoms replaced by the structure

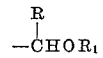

wherein R is a member selected from the class consisting of hydrogen, furyl, and lower alkyl, and $R_1$ is at least one member of the class consisting of hydrogen, lower alkyl, and butoxyethyl, said amino resin and said interpolymer being present in the relative percentages by weight of from 5 percent to 95 percent amino resin and 95 percent to 5 percent of said interpolymer.

2. The resinous composition of claim 1 wherein the amide is acrylamide, said amino resin and said interpolymer resin being present in the relative percentages by weight of from 11.1 percent to 50 percent amino resin and 88.9 percent to 50 percent of said interpolymer.

3. The resinous composition of claim 10 wherein the amino resin is a urea-formaldehyde resin.

4. The resinous composition of claim 10 wherein the amino resin is a melamine-formaldehyde resin.

5. The resinous composition of claim 10 wherein said interpolymer is an interpolymer of acrylamide, styrene, and methacrylic acid.

6. The resinous composition of claim 10 wherein said interpolymer is an interpolymer of acrylamide and vinyl toluene.

7. The resinous composition of claim 10 wherein said interpolymer is an interploymer of acrylamide, styrene, and ethyl acrylate.

8. An article having a solid metallic surface having as a coating thereon a film of the resinous composition of claim 1.

9. The resinous composition of claim 1 wherein the structure

is present in an amount of at least 0.2 equivalent for each amide group of said interpolymer.

10. A resinous composition consisting essentially of an amino resin selected from the class consisting of urea-formaldehyde resins and melamine-formaldehyde resins and an interpolymer of (1) an amide selected from the group consisting of acrylamide, methacrylamide, maleuric acid, alkyl esters of maleuric acid, N-carbamyl maleimide and N-alkoxy methylacrylamides, (2) monoethylenically unsaturated aliphatic carboxylic acid consisting of carbon, hydrogen and oxygen, and (3) at least one other monomer containing a $CH_2=C<$ group, said interpolymer containing from about 5 percent to about 50 percent by weight of said amide based upon the total weight of said interpolymer and about 1 percent to about 25 percent upon a like basis of said monoethylenically unsaturated aliphatic carboxylic acid, said interpolymer being characterized by having amido hydrogen atoms replaced by the structure

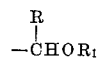

wherein R is a member selected from the class consisting of hydrogen, furyl, and lower alkyl, and $R_1$ is at least one member of the class consisting of hydrogen, lower alkyl, and butoxyethyl, said amino resin and said interpolymer being present in the relative percentages by weight of from 5 percent to 95 percent amino resin and 95 percent to 5 percent of said interpolymer.

References Cited in the file of this patent

UNITED STATES PATENTS

| | | |
|---|---|---|
| 2,173,005 | Strain | Sept. 12, 1939 |
| 2,718,515 | Thomas | Sept. 20, 1955 |
| 2,870,116 | Vogel et al. | Jan. 20, 1959 |
| 2,940,943 | Christenson et al. | June 14, 1960 |
| 2,978,437 | Christenson | Apr. 4, 1961 |
| 2,984,588 | Graulich et al. | May 16, 1961 |

UNITED STATES PATENT OFFICE
CERTIFICATE OF CORRECTION

Patent No. 3,050,495                  August 21, 1962

Roger M. Christenson

It is hereby certified that error appears in the above numbered patent requiring correction and that the said Letters Patent should read as corrected below.

Column 2, lines 13 to 19, the formula should appear as shown below instead of as in the patent:

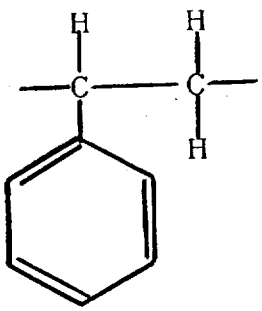

column 3, line 39, for "glycon" read -- glycol --; column 5, line 56, for "difficulty" read -- difficult --; column 8, in the table, first column, line 11 thereof, for "(40+ in Butanol)" read -- 40% in Butanol) --.

Signed and sealed this 17th day of December 1963.

(SEAL)
Attest:
ERNEST W. SWIDER

Attesting Officer

EDWIN L. REYNOLDS
                Acting Commissioner of Patents